US008223651B2

(12) United States Patent
Kano

(10) Patent No.: US 8,223,651 B2
(45) Date of Patent: Jul. 17, 2012

(54) INFORMATION PROCESSING APPARATUS, SUMMARIZING METHOD AND SUMMARIZING PROGRAM

(75) Inventor: Shinya Kano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 285 days.

(21) Appl. No.: 12/292,468

(22) Filed: Nov. 19, 2008

(65) Prior Publication Data

US 2009/0245136 A1 Oct. 1, 2009

(30) Foreign Application Priority Data

Mar. 25, 2008 (JP) ................................. 2008-078524

(51) Int. Cl.
*G01R 31/08* (2006.01)
(52) U.S. Cl. ........................................ 370/238; 370/254
(58) Field of Classification Search .................. 370/238, 370/254
See application file for complete search history.

(56) References Cited

U.S. PATENT DOCUMENTS

| 6,804,199 | B1 * | 10/2004 | Kelly et al. | 370/238 |
| 7,133,928 | B2 * | 11/2006 | McCanne | 709/238 |
| 7,373,543 | B1 * | 5/2008 | Jain et al. | 714/4 |
| 7,639,652 | B1 * | 12/2009 | Amis et al. | 370/337 |
| 2003/0002444 | A1 * | 1/2003 | Shin et al. | 370/238 |
| 2005/0135274 | A1 * | 6/2005 | Molnar et al. | 370/255 |
| 2008/0049751 | A1 * | 2/2008 | Venkat et al. | 370/392 |

FOREIGN PATENT DOCUMENTS

| JP | 08-293880 | 11/1996 |
| JP | 2003-078556 | 3/2003 |
| JP | 2004-343199 | 12/2004 |

OTHER PUBLICATIONS

Dimitri Papadimitriou, "OSPFv2 Routing Protocols Extensions for ASON Routing draft-ietf-ccamp-gmpls-ason-routing-ospf-03.txt", http://tools.ietf.org/html/draft-ietf-ccamp-gmpls-ason-routing-ospf-03 Mar. 2007.
Japanese Office Action mailed Mar. 21, 2012 for corresponding Japanese Application No. 2008-078524, with English-language translation.
Rie Hayashi, et al., "Inter-Domain Redundancy Path Computation Methods Based on PCE", The Institute of Electronics, Information and Communication Engineers Technical Report, PN2007-5, Japan, The Institute of Electronics, Information and Communication Engineers, Jun. 7, 2007, vol. 107, No. 90, pp. 25-30.

* cited by examiner

*Primary Examiner* — Anh-Vu Ly
*Assistant Examiner* — Matthew Hopkins
(74) *Attorney, Agent, or Firm* — Fujitsu Patent Center

(57) ABSTRACT

An information processing apparatus retains topology information indicating how all nodes are connected in a predetermined target area within a network divided into plural areas. The information processing apparatus includes an ingress/egress determining unit that determines, by referring to connected area information indicative of which area an area border node is connected to, an ingress-node group and an egress-node group, a disjoint determining unit that determines, by referring to the topology information, whether two or more disjoint routes from a node(s) of the ingress-node group to reach a node(s) of the egress-node group are present, a summarized-information generating unit that generates summarized information indicating a route from the adjacent area through the target area to the other adjacent area according to determination result by the disjoint determining unit, and a summarized-information reporting unit that reports the summarized information to another area.

22 Claims, 15 Drawing Sheets

FIG.1
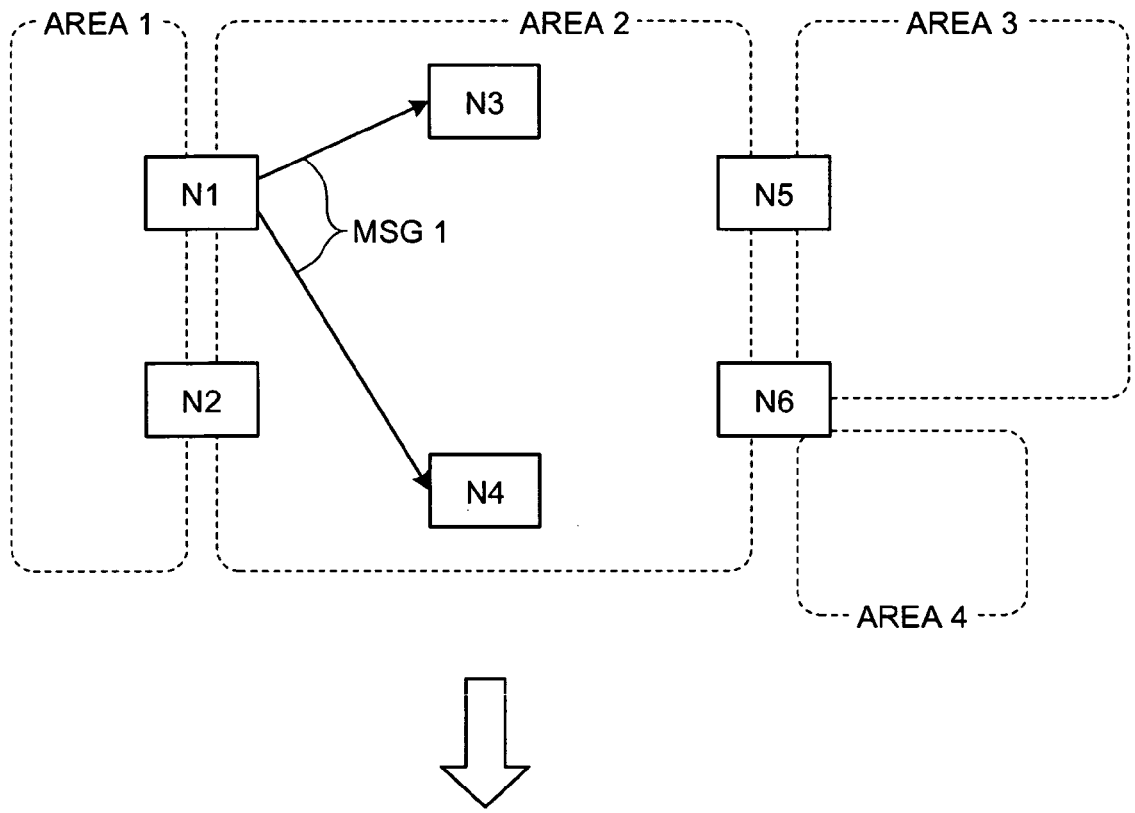
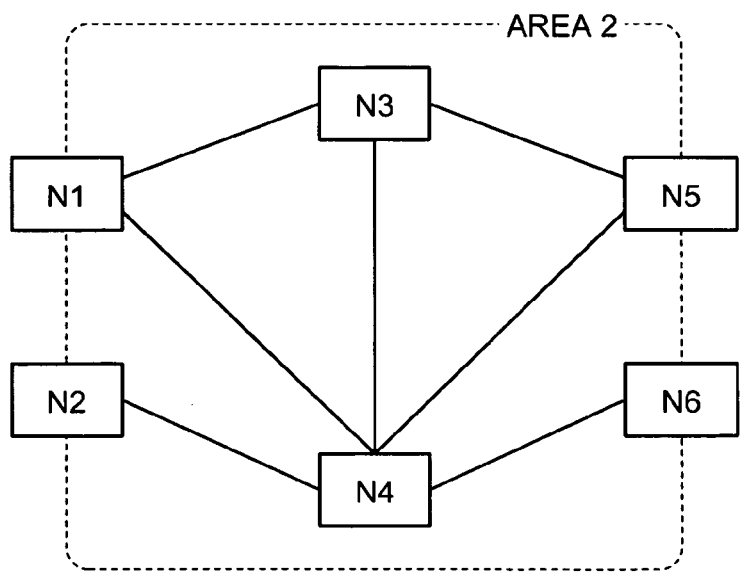

| APPARATUS ID | AREA ID |
|---|---|
| N1 | 1 |
| N2 | 1 |
| N5 | 3 |
| N6 | 3, 4 |

FIG.10
TABLE RETAINED BY N8
| AREA ID | IDENTIFICATION INFORMATION |
|---|---|
| ⋮ | ⋮ |
| 7 | 700 |
| 9 | 900 |
| ⋮ | ⋮ |
TABLE RETAINED BY N12
| AREA ID | IDENTIFICATION INFORMATION |
|---|---|
| ⋮ | ⋮ |
| 8 | 900 |
| 10 | 1000 |
| ⋮ | ⋮ |
FIG.11
ABSTRACT NODE OBTAINED BY ABSTRACTING INGRESS BORDER NODES
| CONNECTED AREA ID (16 BITS) | OWN AREA ID (16 BITS) |
|---|---|
ABSTRACT NODE OBTAINED BY ABSTRACTING EGRESS BORDER NODES
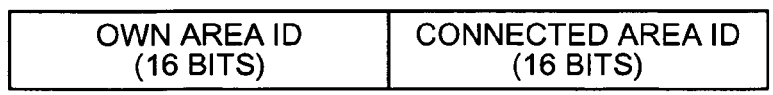
| OWN AREA ID (16 BITS) | CONNECTED AREA ID (16 BITS) |
|---|---|
|◄──────── 32 BITS ────────►|

INFORMATION PROCESSING APPARATUS, SUMMARIZING METHOD AND SUMMARIZING PROGRAM

CROSS-REFERENCE TO RELATED APPLICATION

This application is based upon and claims the benefit of priority of the prior Japanese Patent Application No. 2008-078524, filed on Mar. 25, 2008, the entire contents of which are incorporated herein by reference.

FIELD

The embodiments discussed herein are directed to an information processing apparatus, summarizing method, and summarizing program that summarizes a target area in a network divided into a plurality of areas.

BACKGROUND

Conventionally, in communications performed via a backbone network, a communication apparatus in the network relays data, messages, and others (for example, refer to Japanese Patent Application Laid-open No. 2004-343199).

The communication apparatus uses a predetermined communication protocol. In particular, a communication apparatus using Open Shortest Path First (OSPF) broadcasts, within the network, link information indicative of a link between apparatuses and link state between apparatuses.

This communication apparatus receives the link information to generate topology information indicative of how all communication apparatuses are connected with each other in the network.

Each communication apparatus refers to the topology information to search for a route to an arbitrary destination, for example.

Meanwhile, as the network grows bigger, the link information to be broadcasted further increases, resulting in overgrown topology information retained in each communication apparatus.

To address this problem, a technique has been developed in which the network is divided into a plurality of areas and the broadcast destination of the link information from each communication apparatus is restricted within an area.

Specifically, a node selected from an area or, for example, a totally different server, summarizes link information within the area. Then, the communication apparatus, which summarizes the information representatively, broadcasts resulting summarized information to another area.

Examples of summarizing techniques include a node abstraction technique of abstracting areas into a single node (refer to "OSPFv2 Routing Protocols Extensions for ASON Routing", Dimitri Papadimitriou, URL that includes "tools.ietf.org/html/draft-ietf-ccamp-gmpls-ason-routing-ospf-03".) and a link abstraction technique of abstracting links among apparatuses within an area into links only between area border nodes each serving as an entrance to its own area and area border nodes each serving as an exit to another area.

In the techniques mentioned above, each representative communication apparatus receives and retains summarized information generated in another area.

By referring to the summarized information, it is possible to know how the areas are connected to each other to construct the network, whereby it is possible to search for an approximate route to relay to an arbitrary destination, with the knowledge of which areas to pass through.

However, the summarized information does not include detailed information about links between the apparatuses within each area. Therefore, whether the routes found as a result of the search are redundant cannot be known.

Therefore, redundant routes to an arbitrary destination cannot be set based on the summarized information.

Moreover, it is impossible to find redundant routes to an arbitrary destination and to find a maximum reservable bandwidth of the set redundant routes based on the summarized information.

SUMMARY

It is an object of the present invention to at least partially solve the problems in the conventional technology.

According to an aspect of an embodiment, an information processing apparatus retains topology information indicating how all nodes are connected to configure a network, in a predetermined target area within a network that is divided into a plurality of areas, and the information processing apparatus includes an ingress/egress determining unit that determines, by referring to a storage unit having stored therein connected area information indicative of which area the node at a border with another area is connected to, an ingress-node group of ingress nodes each serving as an entrance to the target area from an adjacent area and an egress-node group of egress nodes each serving as an exit from the target area to another adjacent area, a disjoint determining unit that determines, by referring to the topology information, whether two or more disjoint routes from one or more node of the ingress-node group to reach one or more node of the egress-node group are present, a summarized-information generating unit that performs a process of generating summarized information indicating a route from the adjacent area through the target area to the other adjacent area as a route from an ingress abstract node obtained by abstracting the ingress-node group to an egress abstract node obtained by abstracting the egress-node group according to a result of determination by the disjoint determining unit, and a summarized-information reporting unit that reports the summarized information generated by the summarized-information generating unit to another area.

According to another aspect of an embodiment, an information processing apparatus retains topology information indicating how all nodes are connected, in a predetermined target area within a network that is divided into a plurality of areas, and the information processing apparatus includes an ingress/egress determining unit that determines, by referring to a storage unit having stored therein connected area information indicative of which area the node at a border with another area is connected to, an ingress-node group of ingress nodes each serving as an entrance to the target area from an adjacent area and an egress-node group of egress nodes each serving as an exit from the target area to another adjacent area, a disjoint determining unit that determines, by referring to the topology information, whether two or more disjoint routes from a virtual start-point node through any node of the ingress-node group and any node of the egress-node group to reach a virtual end-point node are present, a summarized-information generating unit that performs a process of generating summarized information indicating a route from the adjacent area through the target area to the other adjacent area as a route from an ingress abstract node obtained by abstracting the ingress-node group to an egress abstract node obtained by abstracting the egress-node group according to a result of determination by the disjoint determining unit, and a summarized-information reporting unit that reports the summarized information generated by the summarized-information generating unit to another area.

According to still another aspect of an embodiment, a method is for summarizing a target area within a network that is divided into a plurality of areas, and the method includes firstly determining, by referring to a storage unit having stored therein connected area information indicative of which area a node at a border with another area is connected to, an ingress-node group of ingress nodes each serving as an entrance to the target area from an adjacent area, and an egress-node group of egress nodes each serving as an exit from the target area to another adjacent area, secondly determining, by referring to topology information of the target area, whether two or more disjoint routes from one or more node of the ingress-node group to reach one or more node of the egress-node group are present, performing a process of generating summarized information indicating a route from the adjacent area through the target area to the other adjacent area as a route from an ingress abstract node obtained by abstracting the ingress-node group to an egress abstract node obtained by abstracting the egress-node group according to a result of determination in the secondly determining, and reporting the summarized information generated in the performing to another area.

According to still another aspect of an embodiment, a computer program product causes a computer to perform the method according to the embodiment as described above.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 1 is a drawing for explaining a general outline of a data relaying apparatus according to a first embodiment;

FIG. 10 is a drawing for explaining a scheme of making identification information identical;

FIG. 11 is a drawing for explaining another scheme of making identification information identical;

DESCRIPTION OF EMBODIMENTS

Figure 2:
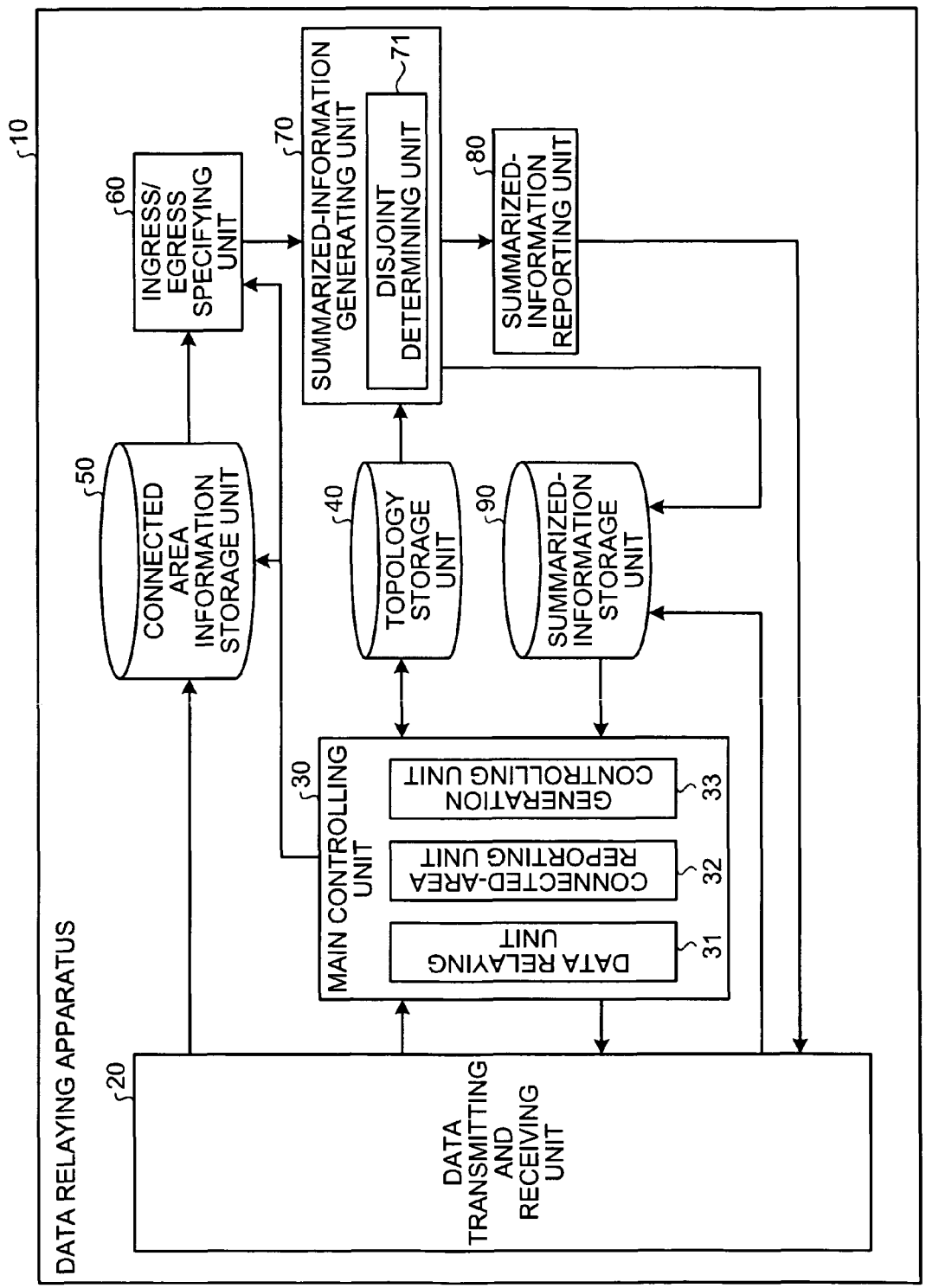
FIG. 2 is a block diagram of the data relaying apparatus according to the first embodiment.

With reference to the attached drawings, exemplary embodiments of a data relaying apparatus are explained in detail below as an information processing apparatus according to the present invention.

[a] First Embodiment

With reference to FIG. 1, a data relaying apparatus according to a first embodiment is explained schematically. The data relaying apparatus implements Generalized Multi-Protocol Label Switching (GMPLS). This data relaying apparatus is located in one area of a network which is divided into plural areas. Further, the data relaying apparatus forms a network with nodes including other data relaying apparatuses similarly implementing GMPLS.

For example, as depicted in FIG. 1, six data relaying apparatuses (N1 to N6 represent apparatus IDs (identifications)) are placed in an area 2. The data relaying apparatus according to the first embodiment corresponds to an area border node placed at a border between different areas.

Conventionally, each data relaying apparatus exchanges a predetermined control message with other apparatuses to know a link state between apparatuses within the area.

Specifically, the data relaying apparatus broadcasts within the area, a link-information reporting message which includes information indicative of links between the apparatuses and other information.

As depicted in FIG. 1, for example, N1 transmits the link-information reporting message (MSG1) to N3 and N4 that are connected to N1.

When N3 and N4 receive the link-information reporting message from outside for the first time, they transfer the link-information reporting message to another adjacent data relaying apparatus.

As a result, as depicted in a lower part of FIG. 1, each data relaying apparatus knows the link state between the apparatuses within the same area.

In the present embodiment, when there are two or more disjoint routes that can connect one area (e.g., area 1) via an adjacent area (e.g., area 2) to another area (e.g., area 3), an area border node of the adjacent area (area 2) generates summarized information in which links between the apparatuses within its own area are summarized, and then reports the summarized information to the other area (area 1 or area 3).

In each area, an area border node generates summarized information in the same manner, and reports the summarized information to another area.

Therefore, each area border node can know the link relation of each area, and is capable of searching for an approximate route for the destination, with the knowledge of which areas to pass through. Further, the area border node can know whether the obtained route has redundancy or not.

Next, the configuration of the area border node is explained. FIG. 2 is a block diagram of a configuration of the data relaying apparatus according to the first embodiment.

As depicted in FIG. 2, a data relaying apparatus 10 includes a data transmitting and receiving unit 20, a main controlling unit 30, a topology storage unit 40, a connected area information storage unit 50, an ingress/egress specifying unit 60, a summarized-information generating unit 70, a summarized-information reporting unit 80, and a summarized-information storage unit 90.

The data transmitting and receiving unit 20 performs a process to transmit and receive a link-information reporting message and live data. On receiving data, the data transmitting and receiving unit 20 determines the type of the received data. Based on a result of determination, the data transmitting and receiving unit 20 determines the destination of the data output.

The main controlling unit 30 is a controlling unit that controls the entire data relaying apparatus 10, and includes a data relaying unit 31, a connected-area reporting unit 32, and a generation controlling unit 33.

The data relaying unit 31 performs a process regarding a link-information reporting message and live data. Specifically, the data relaying unit 31 generates a link-information reporting message, and transmits the generated link-information reporting message via the data transmitting and receiving unit 20 to another data relaying apparatus connected to its own data relaying apparatus 10. Further, the data relaying unit 31 stores information included in a received link-information reporting message in the topology storage unit 40, or transfers the information to another data relaying apparatus.

Figure 3:
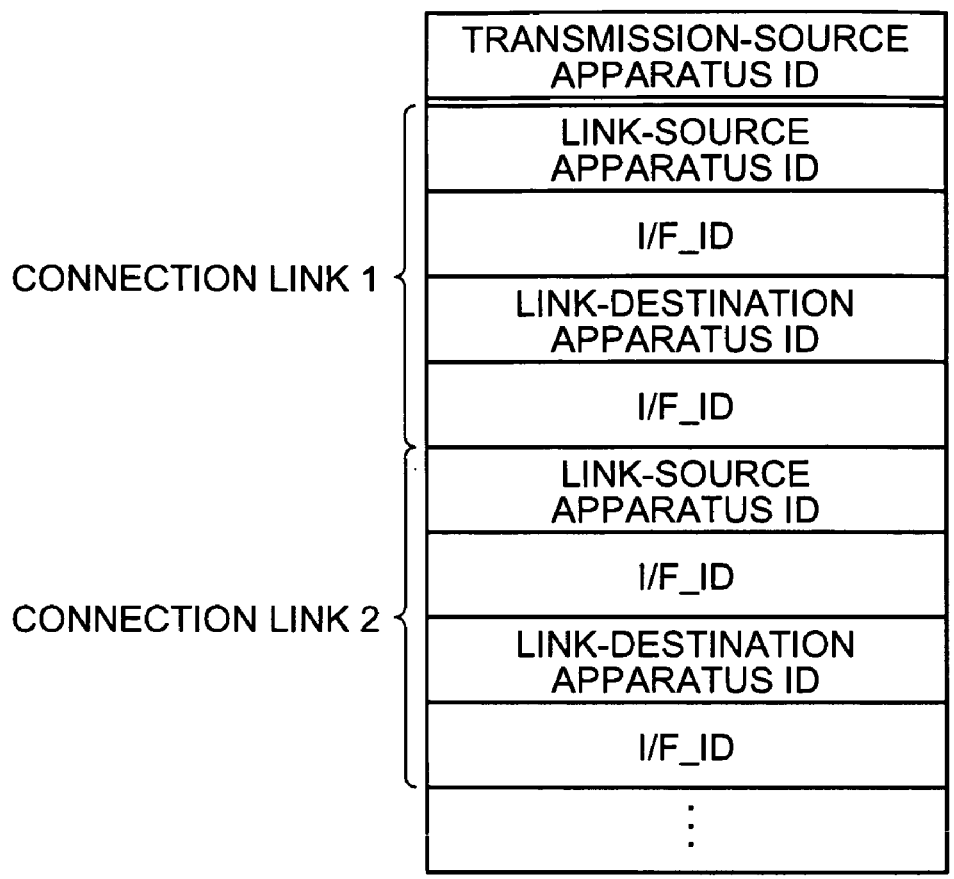
FIG. 3 is a drawing of an example of information stored in a link-information reporting message.

Here, as depicted in FIG. 3, the data relaying unit 31 includes in a link-information reporting message, information such as an apparatus ID of a transmission source, an apparatus ID of a link source, an ID of an I/F (interface) used by the apparatus of the link source, an apparatus ID of the link destination, and an ID of an I/F used by the apparatus of the link source. In the first embodiment, the apparatus ID of the link source and its I/F ID and the apparatus ID of the link destination and its I/F ID represent one link between apparatuses. Here, the apparatus ID of the transmission source and the apparatus ID of the link source correspond to the apparatus ID of the data relaying apparatus 10 in which the data relaying unit 31 itself is included.

When relaying a message or data upon receiving, for example, live data, from the data transmitting and receiving unit 20, the data relaying unit 31 refers to the topology storage unit 40, and determines a relay destination based on the link states among the apparatuses within the area. Then, the data relaying unit 31 transmits the received message or data via the data transmitting and receiving unit 20.

The topology storage unit 40 stores the information prepared by the data relaying unit 31. Specifically, as depicted in FIG. 4, the topology storage unit 40 stores information including apparatus IDs and I/F IDs that indicates links between the apparatuses.

Figure 4:
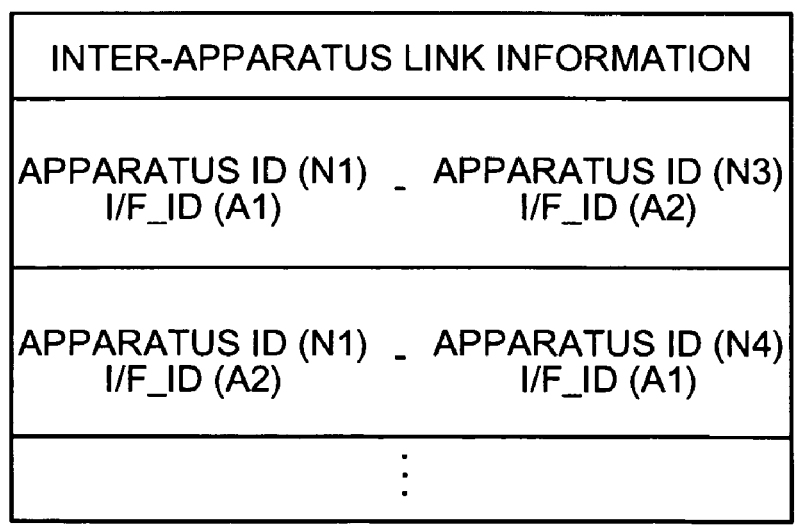
FIG. 4 is a drawing for explaining information stored in a topology storage unit.

For example, as depicted in FIG. 4, in the topology storage unit 40, information including an apparatus ID "N1" and its I/F ID "A1" and an apparatus ID "N3" and its I/F ID "A2" represents one link between apparatuses.

The connected-area reporting unit 32 generates a connected-area reporting message which includes, for example, the area ID of the area to which its own apparatus is connected, and broadcasts the message within the area. Further, the connected-area reporting unit 32 stores information included in a received connected-area reporting message in the connected area information storage unit 50, or transfers the information to another data relaying apparatus.

Figures 5, 6:
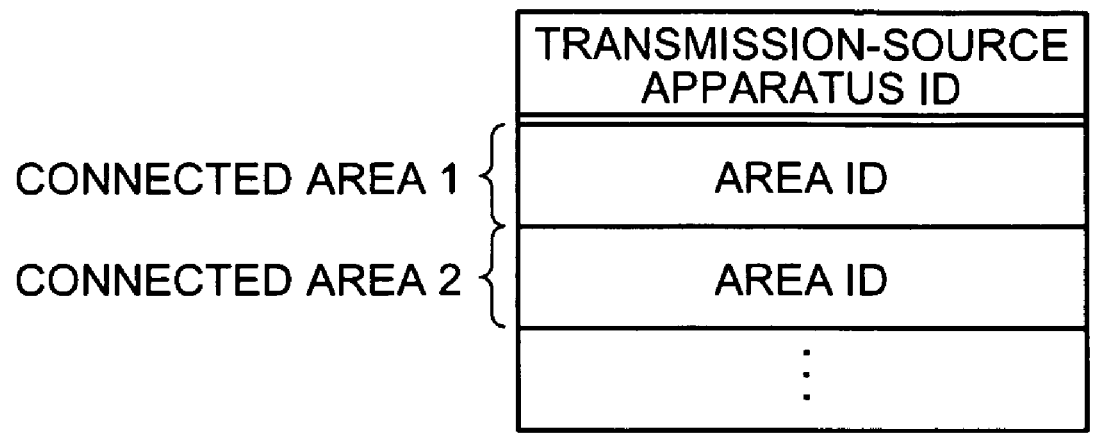
FIG. 5 is a drawing of an example of information stored in a connected-area reporting message.
FIG. 6 is a drawing of an example of information stored in a connected area information storage unit.

For example, as depicted in FIG. 5, the connected-area reporting unit 32 generates a connected-area reporting message including the apparatus ID of the transmission source and the area IDs.

As a result, the connected area information storage unit 50 stores the information generated by the connected-area reporting unit 32. Specifically, as depicted in FIG. 6, the connected area information storage unit 50 stores the apparatus IDs and the area IDs in association with each other.

Here, the connected area information storage unit 50 may store the information in any manner. For example, an administrator may input the information in advance so that the connected area information storage unit 50 holds the information on receiving the input.

The generation controlling unit 33 controls whether to perform a summarized-information generating process in its own apparatus or not. Specifically, the generation controlling unit 33 refers to the information included in the received connected-area reporting message to determine whether the transmission source of the message is connected to the same area to which its own apparatus is connected.

As a result of determination, if the transmission source is connected to the same area, the generation controlling unit 33 compares the apparatus ID of its own apparatus and the apparatus ID of the transmission source to determine whether to perform a summarized-information generating process in it own apparatus or not.

For example, if the value of the apparatus ID of its own apparatus is a maximum among values of apparatus IDs of all area border nodes, the generation controlling unit 33 instructs the ingress/egress specifying unit 60 to start the summarized-information generating process.

Specifically, with reference to FIG. 1, of four area border nodes, the generation controlling unit 33 in N1 refers to the connected-area reporting message received from N2 to determine that N2 is connected to an area 1, to which its own apparatus is also connected.

The generation controlling unit 33 of N1 then compares the apparatus ID "N2" of the transmission source and the apparatus ID "N1" of its own apparatus. Since "N1" is smaller than "N2", the generation controlling unit 33 cancels an instruction for starting the summarized-information generating process.

Here, it is sufficient if the summarized information is generated in one apparatus among the area border nodes (apparatuses) connected to the same area. Therefore, for example, the generation controlling unit 33 may make an instruction to start the summarized-information generating process when the value of the apparatus ID of its own apparatus is a minimum.

Alternatively, the generating controlling unit 33 may control the operation of summarized-information generating process by allowing the summarized-information generating unit 70 to perform the process or prohibiting the summarized-information generating unit 70 from performing the process.

In this manner, in FIG. 1, N2 and N6 generate summarized information of the area 2, for example. Specifically, N2 generates summarized information of the area 2 indicative of routes from the area 1 via the area 2 to an area 3, whilst N6 generates summarized information of the area 2 indicative of routes from the area 3 via the area 2 to the area 1.

The ingress/egress specifying unit 60 specifies an ingress border node serving as an entrance to its own area and an egress border node serving as an exit from its own area.

Specifically, upon receiving an instruction from the generation controlling unit 33, the ingress/egress specifying unit 60 refers to the connected area information storage unit 50.

The ingress/egress specifying unit 60 then selects an ingress border node connected to the same area to which its own apparatus is connected and an egress border node connected to another area, and gives an instruction on the selected nodes to the summarized-information generating unit 70.

When there are a plurality of combinations of an ingress border node and an egress border node, the ingress/egress specifying unit 60 gives an instruction on each combination to the summarized-information generating unit 70.

The summarized-information generating unit 70 is a processing unit that generates summarized information in which links between the apparatuses in the area are summarized, and includes a disjoint determining unit 71.

Specifically, when the summarized-information generating unit 70 receives the instruction on the ingress border node and the egress border node from the ingress/egress specifying unit 60, the disjoint determining unit 71 determines whether there are two or more disjoint routes from the ingress border node to the egress border node.

Figure 7:
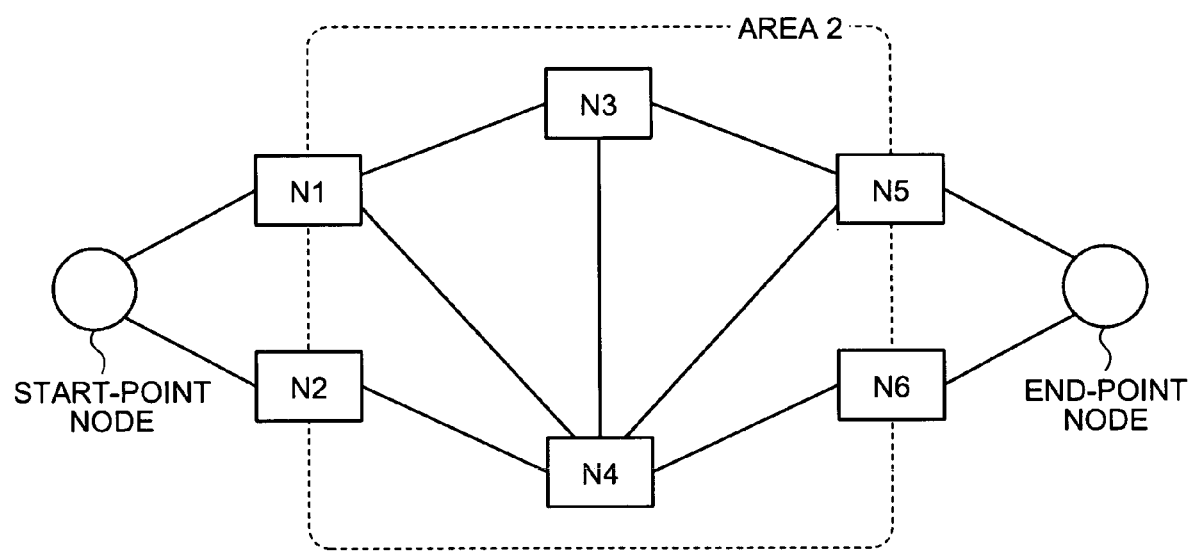
FIG. 7 is a drawing for explaining a determining technique by a disjoint determining unit.
Figure 8:
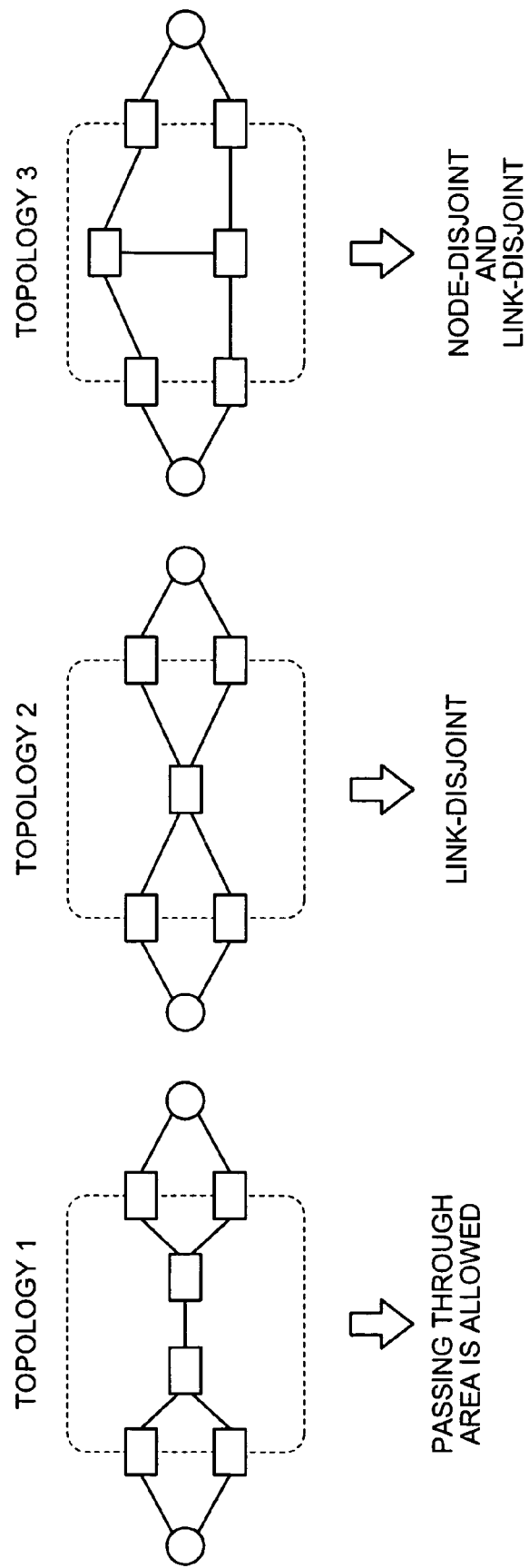
FIG. 8 is a drawing for explaining two types of determination results, assuming various link states between apparatuses.

A manner of determination by the disjoint determining unit 71 is explained with reference to FIGS. 7 and 8. First, as depicted in FIG. 7, the disjoint determining unit. 71 refers to the topology storage unit 40 to know the link state between the apparatuses in its own area, to virtually set a start-point node and an end-point node.

Furthermore, the disjoint determining unit 71 generates a virtual link state between the apparatuses, where the start-point node is connected to each ingress border node and the end-point node is connected to each egress border node.

Then, the disjoint determining unit 71 determines whether there are two or more disjoint routes from the start-point node to the end-point node.

Here, disjoint of each route may be determined based on link-disjoint or node-disjoint.

Whether the disjoint determining unit 71 determines based on link-disjoint or node-disjoint is set in advance. For example, the disjoint determining unit 71 determines whether there are two or more routes from the start-point node to the end-point node that do not pass thorough the same link.

The link-disjoint routes may be determined based on, for example, Edge-Disjoint Shortest Pair algorithm.

Alternatively, the disjoint determining unit 71 may determine whether there are two or more routes that do not pass through the same node, not the same link.

In this case, the Vertex-Disjoint Shortest Pair algorithm can be used, for example.

Two types of determination results are explained below, assuming various link states among apparatuses. As depicted in FIG. 8, in a topology 1, there are no two or more routes not passing through the same link, and no two or more routes not passing through the same node. Note that passing through the area is allowed.

In a topology 2, there are two or more routes not passing through the same link, but there are two or more routes not passing through the same node.

In a topology 3, there are two or more routes not passing through the same link, and there are two or more routes not passing through the same node.

As a result of determination by the disjoint determining unit 71, if there are two or more disjoint routes, the summarized-information generating unit 70 treats the ingress border nodes as one abstract node and the egress border nodes as one abstract node, and gives predetermined identification information to each abstract node separately.

Then, the summarized-information generating unit 70 summarizes the links between the apparatuses in the area, assuming that the abstract nodes are linked to each other, thereby generating summarized information including the identification information. Then, the summarized information is stored in the summarized-information storage unit 90, and is output to the summarized-information reporting unit 80.

Meanwhile, the summarized information is generated in each area by a representative area border node.

Figure 9:
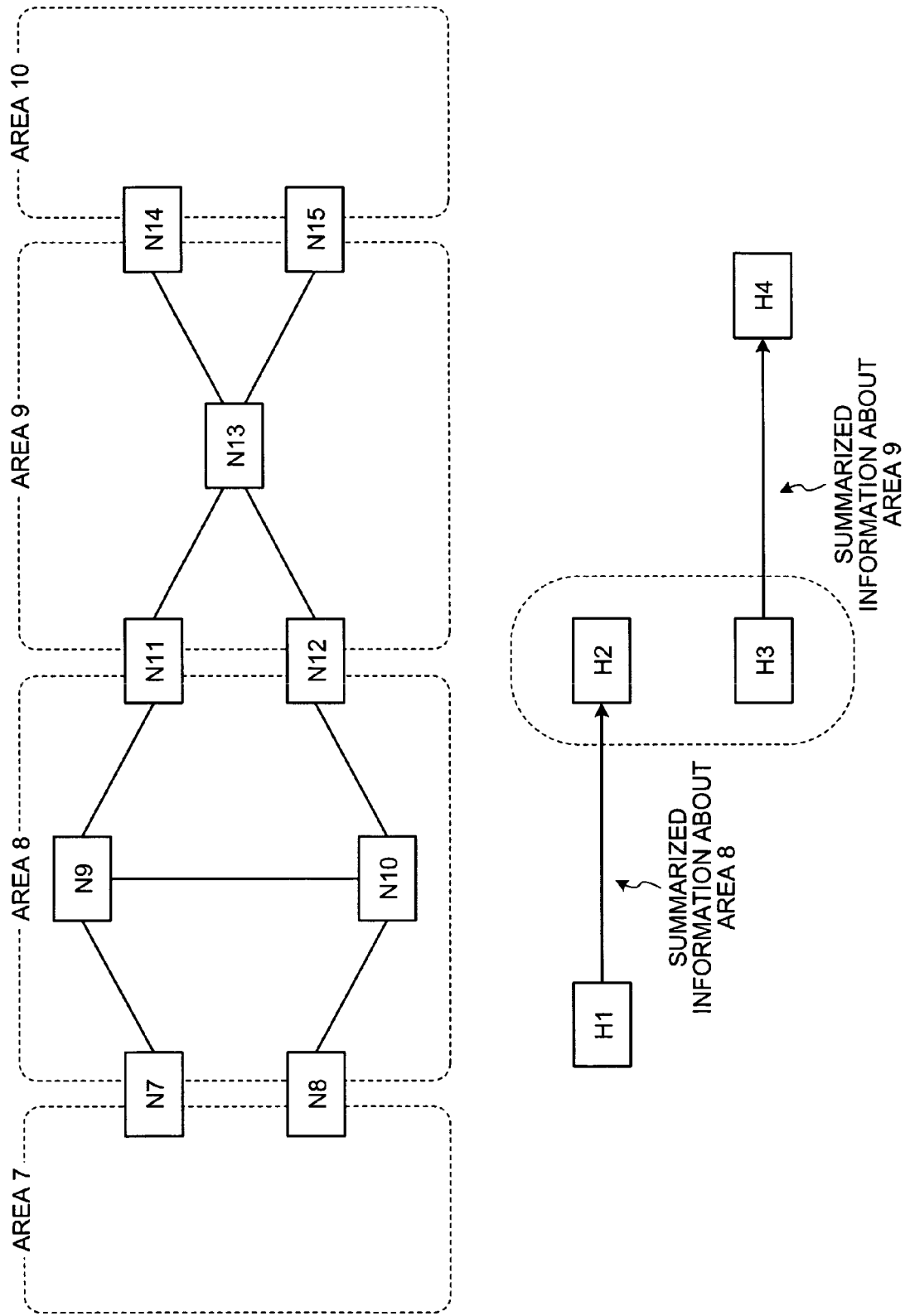
FIG. 9 is a drawing of summarized information generated in each area.

For example, as depicted in FIG. 9, in an area 8, summarized information of the area 8 indicative of routes from the area 7 via the area 8 to an area 9 is generated by N8. In the area 9, summarized information indicative of routes from the area 8 via the area 9 to an area 10 is generated by N12.

Here, N8 generates summarized information using predetermined identification information given to an abstract node "H1" obtained by abstracting N7 and N8, which are ingress border nodes, into one and an abstract node "H2" obtained by abstracting N11 and N12, which are egress border nodes, into one.

Also, N12 generates summarized information using predetermined identification information given to an abstract node "H3" obtained by abstracting N11 and N12, which are ingress border nodes, into one and an abstract node "H4" obtained by abstracting N14 and N15, which are egress border nodes, into one.

These pieces of summarized information are broadcasted to another area by the summarized-information reporting unit 80, which will be explained further below. With the reported summarized information, the representative area border node knows the link relation in the area.

Therefore, it is desirable that the representative area border node associate these pieces of summarized information with each other.

In other words, desirably the identification information given to H2 by N8 is made identical to the identification information given to H3 by N12.

These pieces of identification information may be made identical based on identification information defined by a table set in advance by the administrator.

Specifically, as depicted in FIG. 10, the table associates the area ID of an area to which the area border node is connected with the identification information set separately for each area.

When N8 refers to the table, N8 knows that the egress border node is connected to the area 9. Then, N8 gives identification information "900" to H3.

In the same manner, on referring to the table, N12 knows that the ingress border node is connected to the area 8. Then, N12 gives identification information "900" to H4.

In this manner, the same identification information can be given to corresponding abstract nodes more immediately in comparison with a technique explained later, according to which area IDs are combined.

In the alternative technique of making these pieces of identification information identical, the identification information may be generated by combining the area ID of its own area and the area ID of the connecting area together.

Specifically, as depicted in FIG. 11, when the area ID has 16 bits, identification information of 32 bits is provided. Note that the number of bits of the area ID is not restricted to 16 bits.

Here, the abstract node obtained by abstracting the ingress border nodes is provided with 32-bit identification information with its upper 16 bits representing the area ID of the connecting area and its lower 16 bits representing the area ID of its own area.

On the other hand, the abstract node obtained by abstracting the egress border nodes is provided with 32-bit identification information with its upper 16 bits representing the area ID of its own area and its lower 16 bits representing the area ID of the connecting area.

For example, N8 provides H2 with identification information "89". In the similar manner, N12 provides H3 with identification information "89".

In this manner, the identification information can be made identical without the need of setting and storing the table in advance and providing an additional storage unit, which is required in the technique mentioned earlier.

Returning to the explanation of the configuration, the summarized-information reporting unit 80 reports the summarized information generated by the summarized-information generating unit 70 to another area.

Specifically, upon receiving the summarized information from the summarized-information generating unit 70, the summarized-information reporting unit 80 generates an abstract-link-information reporting message including the summarized information, and broadcasts the abstract-link-information reporting message via the data transmitting and receiving unit 20.

Figure 12:
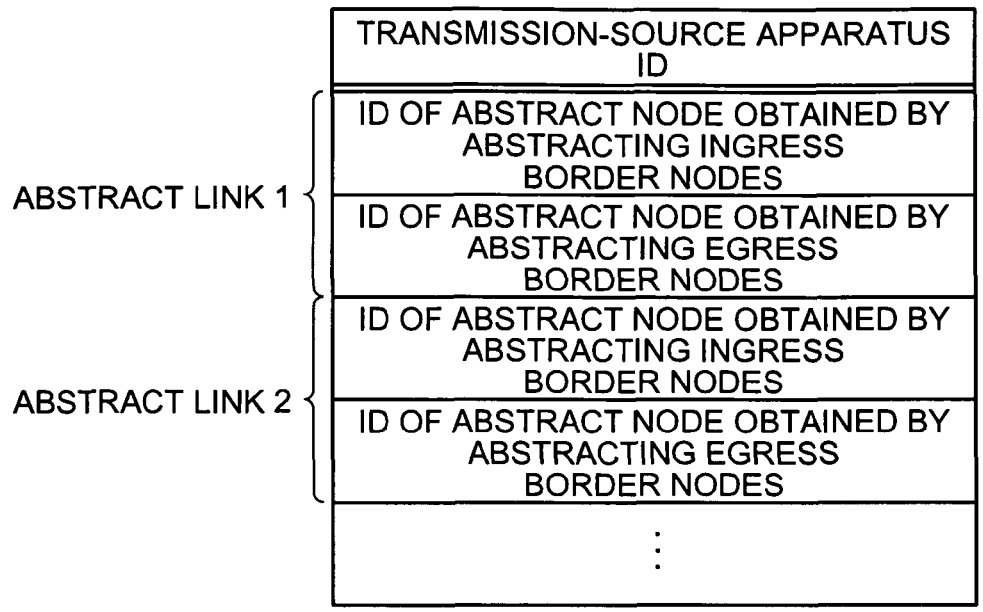
FIG. 12 is a drawing of an example of information stored in an abstract-link-information reporting message.

Here, as depicted in FIG. 12, the summarized-information reporting unit 80 includes in the abstract-link-information reporting message, information such as the apparatus ID of the transmission source, the ID of the abstract node obtained by abstracting the ingress border nodes, and the ID of the abstract node obtained by abstracting the egress border nodes. In the first embodiment, the IDs of the two abstract nodes represent one link (abstract link) between the abstract nodes. Note that the apparatus ID of the transmission source is the apparatus ID of its own apparatus.

The summarized-information storage unit 90 receives from the summarized-information generating unit 70 the summarized information generated by its own apparatus, receives from the data transmitting and receiving unit 20 the summarized information transmitted from the area border node of another area, and then stores these pieces of summarized information therein.

The data relaying unit 31 of the main controlling unit 30 refers to the topology storage unit 40 and also the summarized-information storage unit 90 to search for a route to the data destination.

Figure 13:
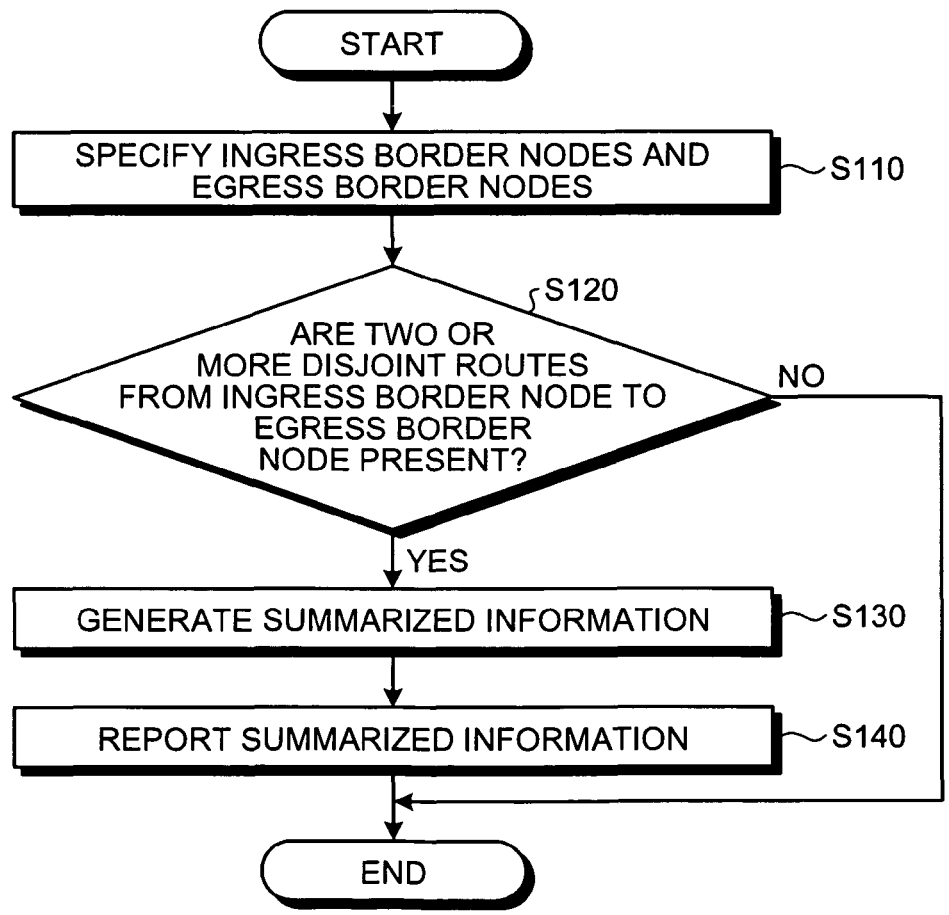
FIG. 13 is a flowchart for explaining a process operation from generation to reporting of summarized information according to the first embodiment.

Next, a flow of the process by the data relaying apparatus 10 according to the first embodiment is explained. FIG. 13 is a flowchart for explaining a process operation from generation to reporting of summarized information. The process operation illustrated in FIG. 13 is performed when the generation controlling unit 33 instructs the ingress/egress specifying unit 60 to start the process.

First, the ingress/egress specifying unit 60 specifies ingress border nodes and egress border nodes (step S110).

The disjoint determining unit 71 of the summarized-information generating unit 70 then determines, for each specified ingress border node and egress border node, whether there are two or more disjoint routes from the ingress border node to the egress border node (step S120).

If it is determined that two or more routes are present ("Yes" at step S120), the summarized-information generating unit 70 generates summarized information (step S130).

The summarized-information reporting unit 80 reports the summarized information to another area (step S140), and the process ends.

As has been explained above, according to the first embodiment, depending on the determination result of the disjoint determining unit 71, whether to generate summarized information is determined. The summarized information is generated only when two or more disjoint routes are present. Therefore, a route obtained as a result of search by using the summarized information always has redundancy.

[b] Second Embodiment

In the first embodiment, it is set in advance whether the determination on disjoint of two or more routes is based on node-disjoint or link-disjoint.

In a second embodiment, unlike the first embodiment, the disjoint is determined based both on node-disjoint and link-disjoint. Furthermore, in the second embodiment, a data relaying apparatus generates summarized information including information indicative of one of node-disjoint and link-disjoint, in addition to the predetermined identification information given to each abstract node.

Figure 14:
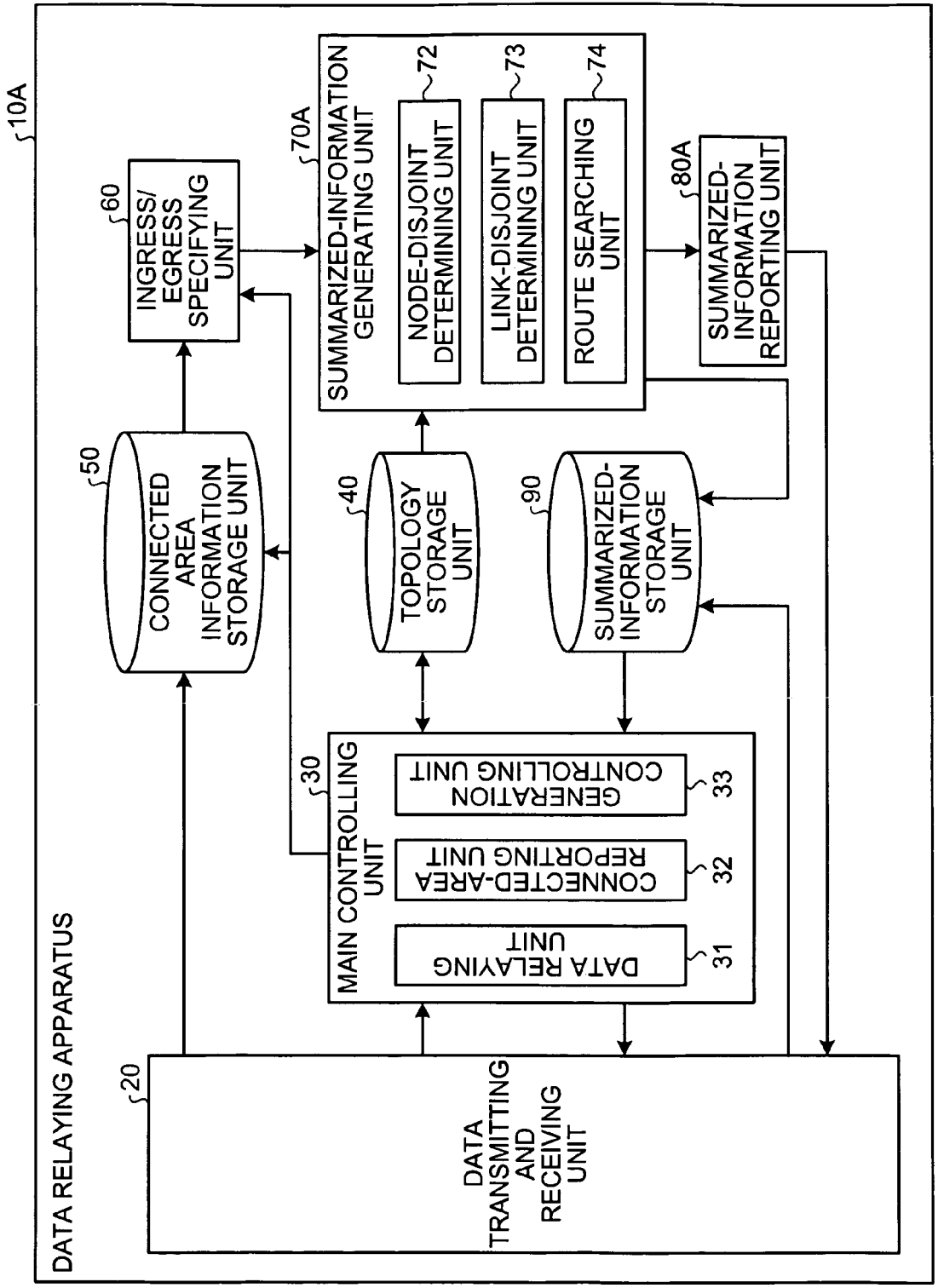
FIG. 14 is a block diagram of a data relaying apparatus according to a second embodiment.

FIG. 14 is a block diagram of a configuration of a data relaying apparatus 10A according to the second embodiment. As depicted in FIG. 14, unlike the first embodiment, a summarized-information generating unit 70A of the second embodiment includes a node-disjoint determining unit 72, a link-disjoint determining unit 73, and a route searching unit 74. Here, similar components to those in the first embodiment are not explained herein. In the following, only the summarized-information generating unit 70A and a summarized-information reporting unit 80A are explained.

Specifically, when the summarized-information generating unit 70A accepts an instruction on the ingress border nodes and the egress border nodes from the ingress/egress specifying unit 60, the node-disjoint determining unit 72 first determines whether two or more routes from the ingress border node to the egress border node not passing through the same node are present.

If it is determined that two or more such routes are present, the summarized-information generating unit 70A takes the ingress border nodes as one abstract node and the egress border nodes as one abstract node, and provides predetermined identification information for each abstract node separately.

Then, the links among the apparatus within the area are summarized assuming that the abstract nodes are coupled, and summarized information including the identification information and protection attribute information indicative of node-disjoint is generated. Here, two or more routes that are node-disjoint are also link-disjoint.

On the other hand, if it is determined as a result of determination as to node-disjoint that two or more such routes are not present, the link-disjoint determining unit 73 of the summarized-information generating unit 70A determines whether two or more routes from an ingress border node to an egress border node not passing through the same link are present.

If it is determined that two or more such routes are present, the summarized-information generating unit 70A provides predetermined identification information for each abstract node separately in a manner similar to that explained above, and generates summarized information including the identification information and protection attribute information indicative of link-disjoint.

On the other hand, if it is determined as a result of determination as to link-disjoint that two or more such routes are not present, the route searching unit 74 of the summarized-information generating unit 70A then searches for a route from the ingress border node to the egress border node.

If it is determined as a result of search that such a route is present, the summarized-information generating unit 70A provides predetermined identification information for each abstract node separately in a manner similar to that explained above, and generates summarized information including the identification information and protection attribute information indicating that passing through the area is allowed.

After generating summarized information based on the determination by any relevant one(s) of the node-disjoint determining unit 72 and the link-disjoint determining unit 73 or the search by the route searching unit 74, the summarized-information generating unit 70A stores the summarized information in the summarized-information storage unit 90 and outputs the summarized information to the summarized-information reporting unit 80A.

The summarized-information reporting unit 80A reports the summarized information generated by the summarized information generating unit 70A to another area.

Specifically, upon receiving the summarized information from the summarized-information generating unit 70A, the summarized-information reporting unit 80A generates an abstract-link-information reporting message including the summarized information, and then broadcasts the abstract-link-information reporting message via the data transmitting and receiving unit 20.

Figure 15:
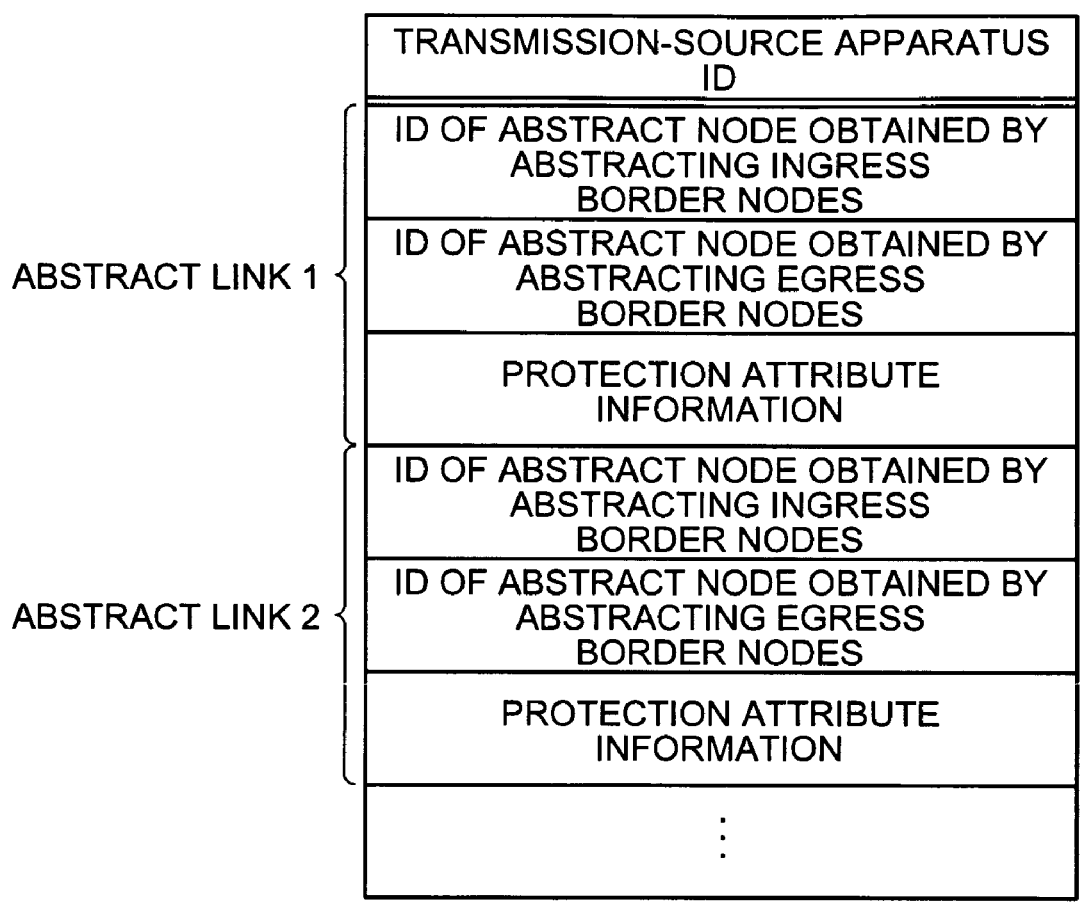
FIG. 15 is a drawing of an example of information stored in an abstract-link-information reporting message according to the second embodiment.

Here, as depicted in FIG. 15, in the second embodiment, in the abstract-link-information reporting message, the ID of the ingress abstract node, the ID of the egress abstract node, and the protection attribute information indicative of an attribute of the link between the abstract nodes represent one link (abstract link) between the abstract nodes.

Figure 16:
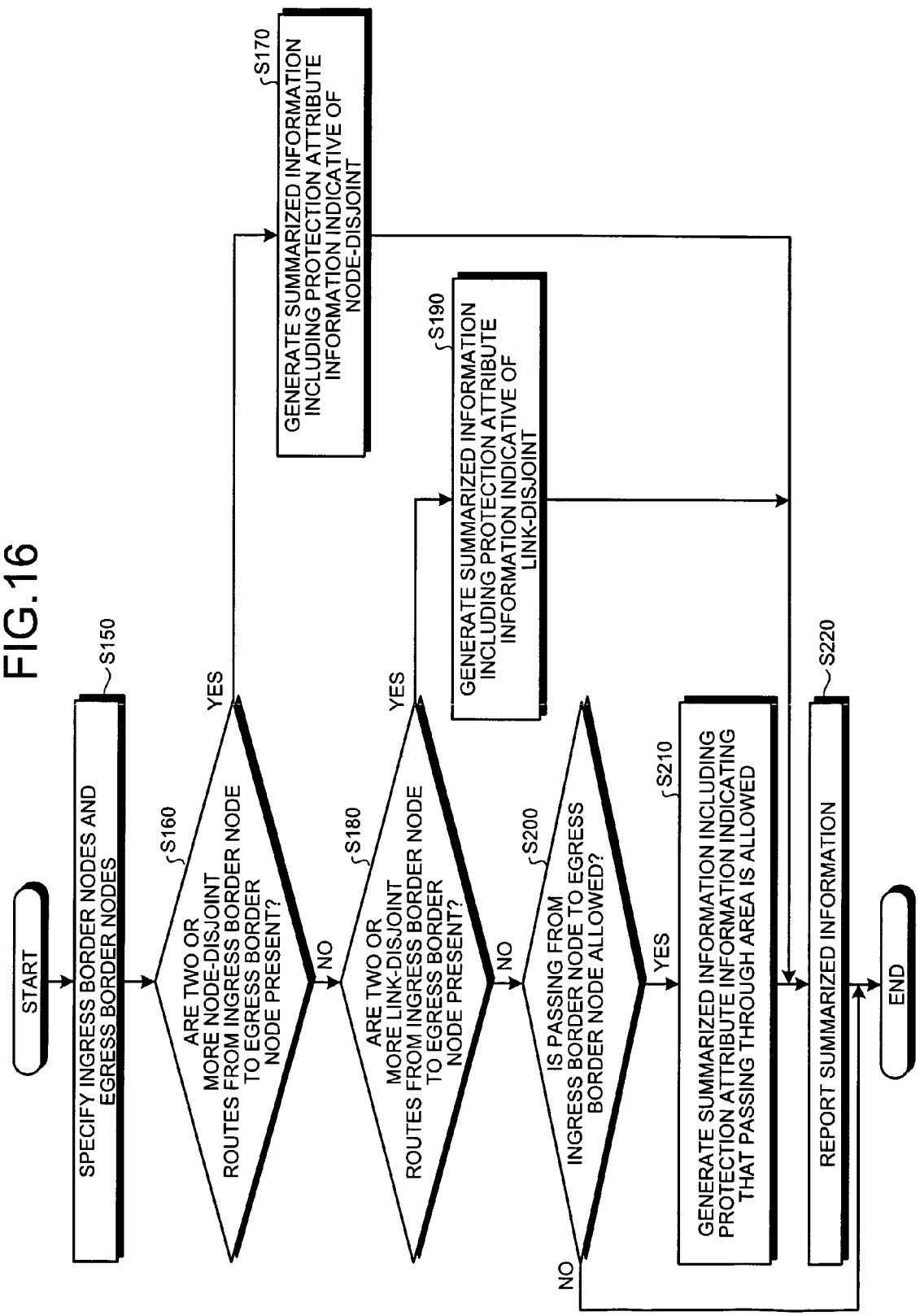
FIG. 16 is a flowchart for explaining a process operation from generation to reporting of summarized information according to the second embodiment.

Next, a flow of the process by the data relaying apparatus 10A according to the second embodiment is explained. FIG. 16 is a flowchart for explaining a process operation from generation to reporting of summarized information. The process operation illustrated in FIG. 16 is performed when the generation controlling unit 33 instructs the ingress/egress specifying unit 60 to start the process.

First, the ingress/egress specifying unit 60 specifies ingress border nodes and egress border nodes (step S150).

The node-disjoint determining unit 72 of the summarized-information generating unit 70A then determines, for each specified ingress border node and egress border node, whether there are two or more disjoint routes from the ingress border node to the egress border node (step S160).

If it is determined that such routes are present ("Yes" at step S160), the summarized-information generating unit 70A generates summarized information including protection attribute information indicative of node-disjoint (step S170).

On the other hand, if such routes are not present ("No" at step S160), the link-disjoint determining unit 73 of the summarized-information generating unit 70A determines whether there are two or more link-disjoint routes from the ingress border node to the egress border node (step S180).

If it is determined that such routes are present ("Yes" at step S180), the summarized-information generating unit 70A generates summarized information including protection attribute information indicative of link-disjoint (step S190).

On the other hand, if such routes are not present ("No" at step S180), the route searching unit 74 of the summarized-information generating unit 70A determines whether passing from the ingress border node to the egress border node is allowed (step S200).

If it is determined that such passing is allowed ("Yes" at step S200), the summarized-information generating unit 70A generates summarized information including protection attribute information indicating that passing through the area is allowed (step S210).

Then, the summarized information is reported by the summarized-information reporting unit 80A to another area (step S220), and then the process ends.

Meanwhile, since bandwidth control is performed among the data relaying apparatuses, the link-information reporting message also includes bandwidth information among the apparatuses.

Figure 17:
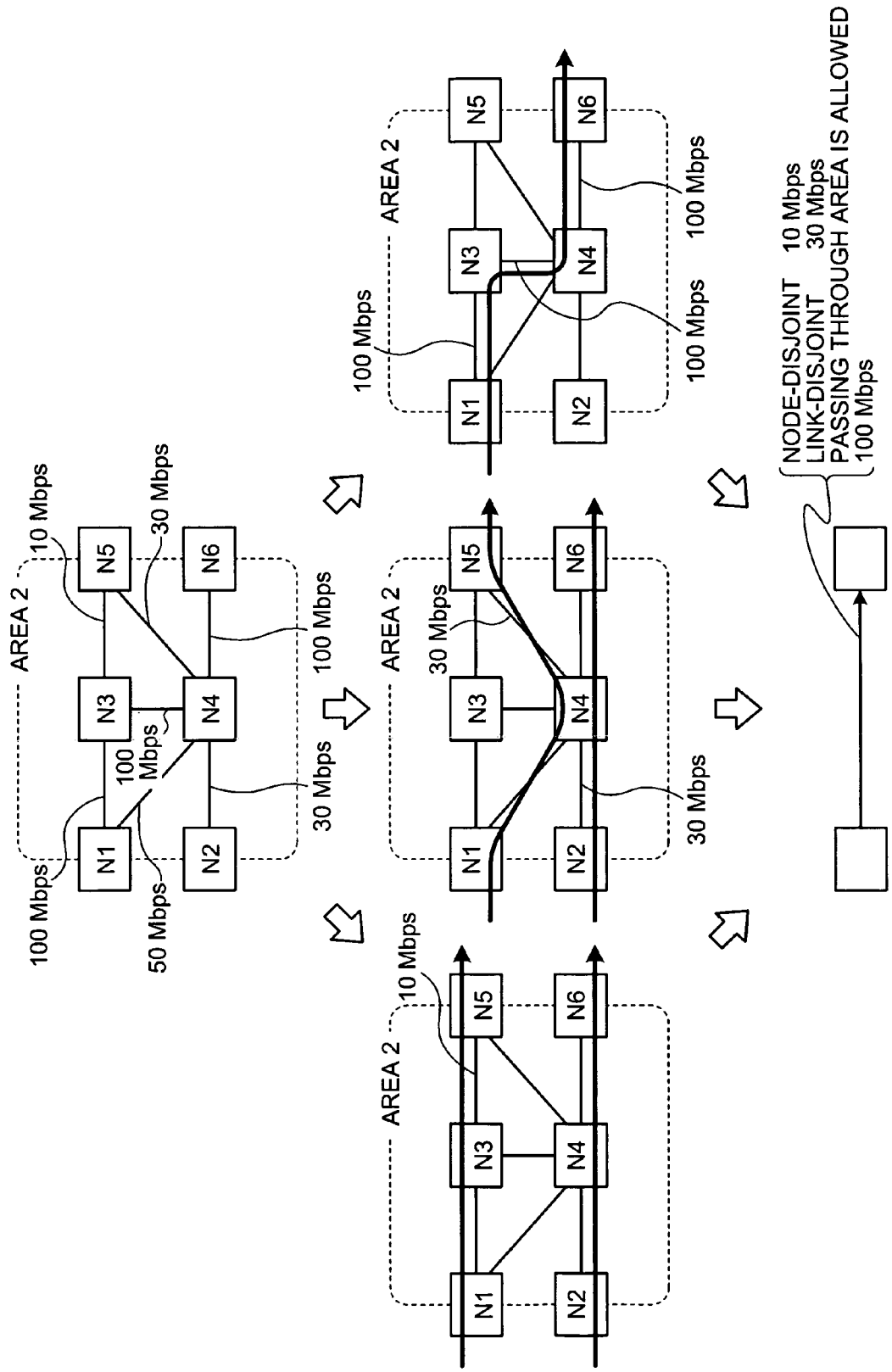
FIG. 17 is a drawing for explaining a modification example of the second embodiment.

Therefore, as depicted in FIG. 17, each data relaying apparatus refers to the topology storage unit having stored therein the information included in the link-information reporting message to also know the bandwidth of the links in the area.

Thus, when two or more disjoint routes are present, the summarized-information generating unit 70A may generate summarized information including bandwidth information indicative of a maximum bandwidth that can be reserved by at least two routes.

For example, in an area 2, two routes depicted in a left part in the middle of FIG. 17 are node-disjoint, and the bandwidth that can be reserved by these two routes is 10 megabits per second. These are the only two node-disjoint routes in the area 2, and 10 megabits per second is a maximum bandwidth that can be reserved.

Also, for example, in the area 2, two routes depicted in a center part in the middle of FIG. 17 are link-disjoint, and the bandwidth that can be reserved by these two routes is 30 megabits per second. Other than these two routes, there are two link-disjoint routes in the area 2, but 30 megabits per second is a maximum bandwidth that can be reserved.

Here, when passing through the area 2 is allowed, summarized information including bandwidth information indicative of a maximum bandwidth that can be reserved by one route may be generated.

For example, in the area 2, a route depicted in a right part in the middle of FIG. 17 can reserve a maximum bandwidth of 100 megabits per second.

When the routes are node-disjoint, they are also link-disjoint and allow passing through the area. Therefore, the summarized-information generating unit 70A generates summarized information separately for each piece of protection attribute information.

That is, as first summarized information for the area 2, the summarized-information generating unit 70A generates summarized information including the identification information explained above, the protection attribute information indicative of node-disjoint, and bandwidth information indicative of, for example, 10 megabits per second.

Furthermore, as second summarized information for the area 2, the summarized-information generating unit 70A generates summarized information including the identification information explained above, the protection attribute information indicative of link-disjoint, and bandwidth information indicative of, for example, 30 megabits per second.

Still further, as third summarized information for the area 2, the summarized-information generating unit 70A generates summarized information including the identification information explained above, the protection attribute information indicating that passing through the area is allowed, and bandwidth information indicative of, for example, 100 megabits per second.

Figure 18:
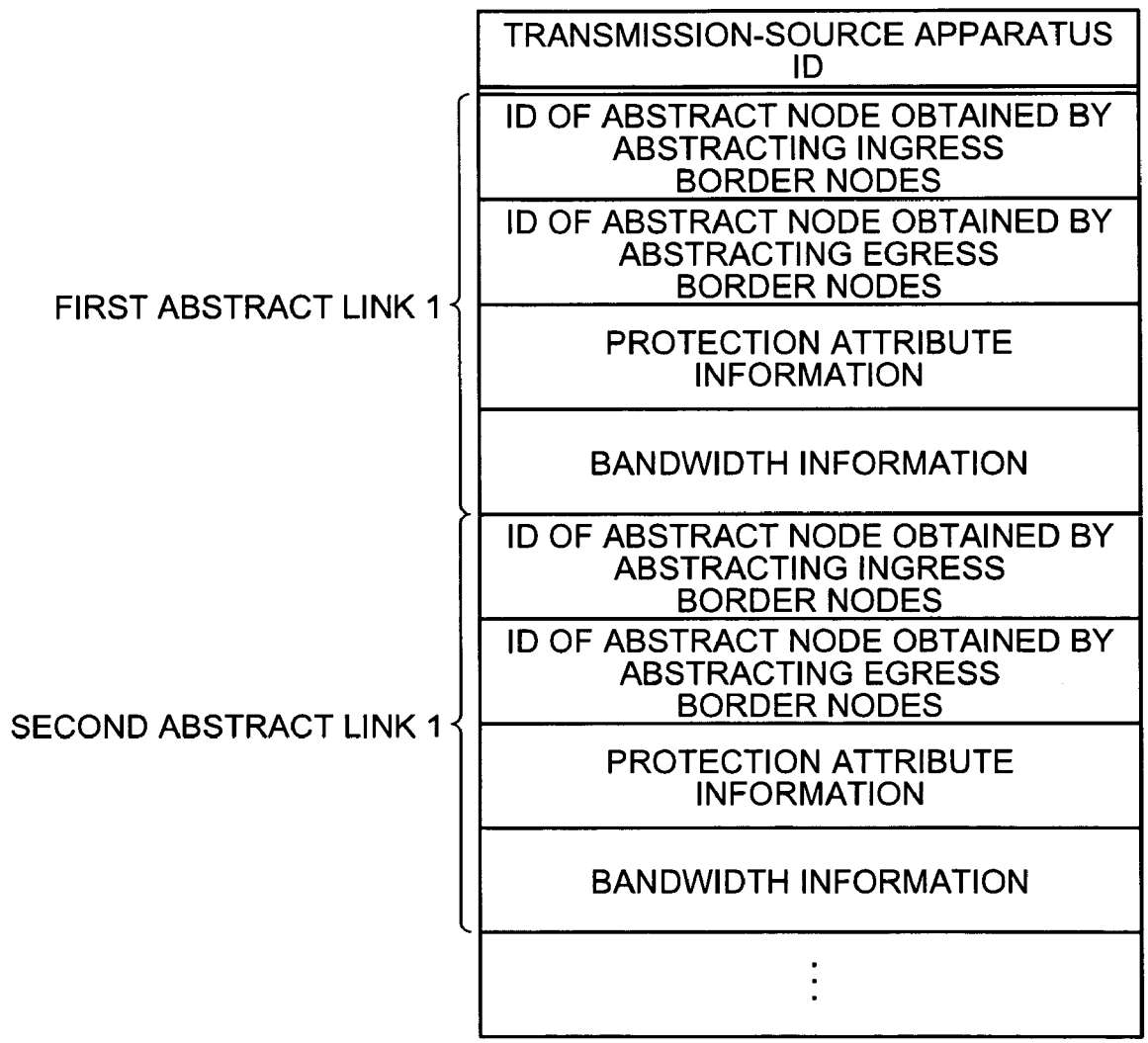
FIG. 18 is a drawing of an example of information stored in an abstract-link-information reporting message according to the modification example.

Here, as depicted in FIG. 18, in this case, in the abstract-link-information reporting message, the ID of the ingress abstract node, the ID of the egress abstract node, the protection attribute information, and the bandwidth information represent one link (abstract link) between the abstract nodes. Furthermore, even the same abstract links are distinguished by the protection attribute information.

Figure 19:
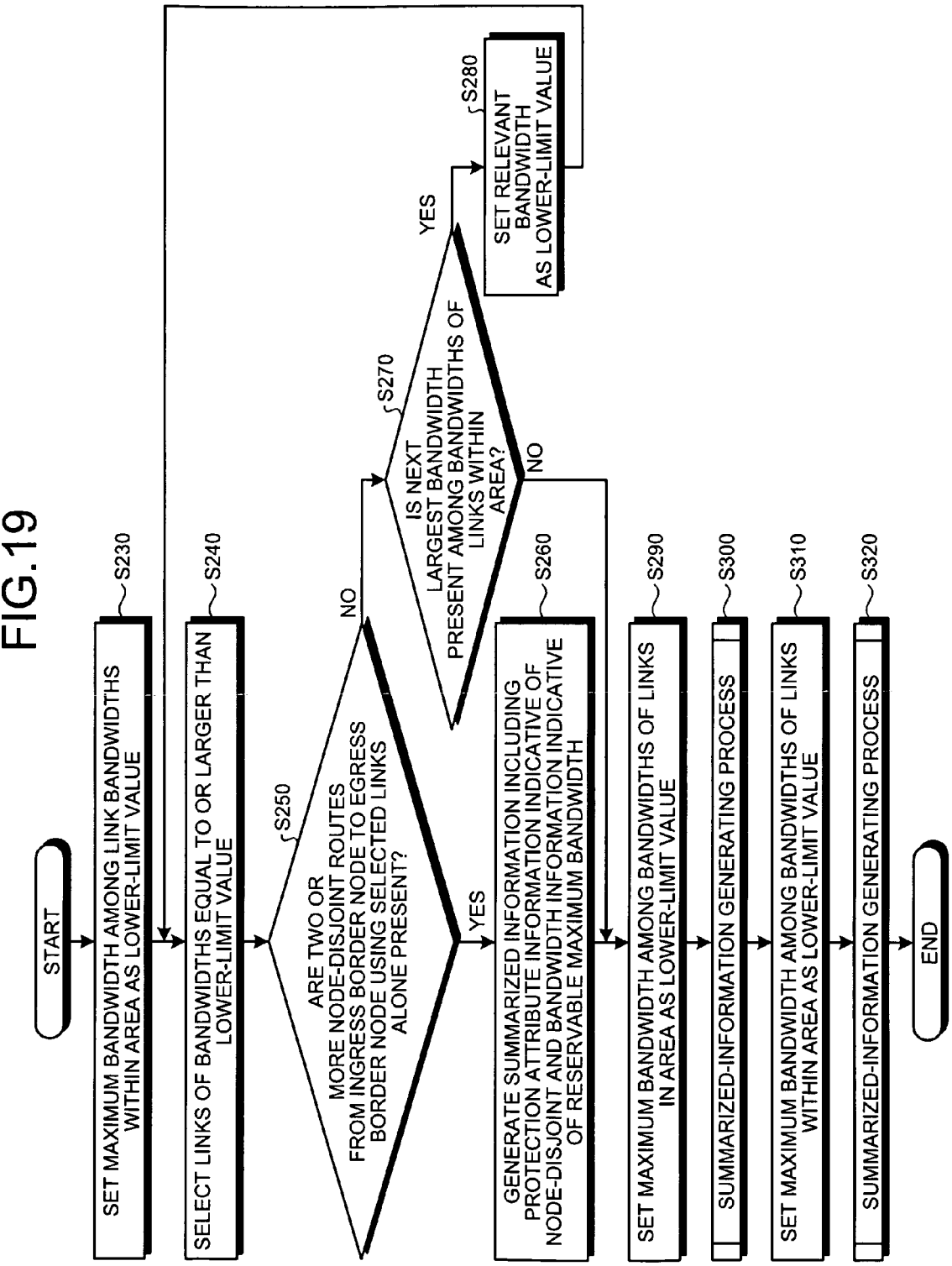
FIG. 19 is a flowchart for explaining a process operation of a summarized-information generating unit according to the modification example.

A flow of the process by the summarized-information generating unit 70A when summarized information including bandwidth information is generated is explained. FIG. 19 is a flowchart for explaining a process operation of the summarized-information generating unit 70A, the process operation being performed when the summarized-information generating unit 70A accepts an instruction on ingress border nodes and egress border nodes from the ingress/egress specifying unit 60.

First, the summarized-information generating unit 70A refers to the topology storage unit 40 to set a maximum bandwidth of bandwidths of links within the area as a lower-limit value (step S230), and then selects links of bandwidths equal to or larger than the lower-limit value (step S240).

The node-disjoint determining unit 72 of the summarized-information generating unit 70A determines whether there are two or more node-disjoint routes from an ingress border node to an egress border node using only the selected links (step S250).

If it is determined that such two or more routes are present ("Yes" at step S250), the summarized-information generating unit 70A generates summarized information including protection attribute information indicative of node-disjoint and bandwidth information indicative of a reservable maximum bandwidth (step S260).

On the other hand, if such routes are not present ("No" at step S250), the summarized-information generating unit 70A determines whether the next largest bandwidth is present among the bandwidths of links within the area (step S270).

If the next largest bandwidth is present ("Yes" at step S270), the summarized-information generating unit 70A sets the next largest bandwidth as a lower-limit value (step S280), selects links of bandwidths equal to or larger than that lower-limit value (step S240), and then the subsequent process is performed.

On the other hand, if the next largest bandwidth is not present ("No" at step S270) or after summarized information is generated (step S260), the summarized-information generating unit 70A sets the maximum bandwidth among the bandwidths of the links in the area as a lower-limit value (step S290).

Based on a determination by the link-disjoint determining unit 73, the summarized-information generating unit 70A then performs a summarized-information generating process from steps S230 to S280 explained above (step S300).

In the summarized-information generating process, if the next largest bandwidth is not present or after summarized information is generated, the summarized-information generating unit 70A again sets the largest bandwidth among the bandwidths of the links within the area as a lower-limit value (step S310).

Based on a determination by the route searching unit 74, the summarized-information generating unit 70A then performs a summarized-information generating process from steps S230 to S280 explained above (step S320), and the process ends.

Here, instead of generating summarized information for each piece of protection attribute information, one piece of summarized information may be generated.

In this case, the summarized information includes, for example, protection attribute information indicative of node-disjoint, bandwidth information indicative of 10 megabits per second, protection attribute information indicative of link-disjoint, bandwidth information indicative of 30 megabits per second, protection attribute information indicating that passing through the area is allowed, and bandwidth information indicative of 100 megabits per second.

As has been explained above, according to the second embodiment, even when two or more disjoint routes are present, these routes are distinguished based on node-disjoint or link-disjoint, and attribute information capable of determining the type is provided to the summarized information. With this, it is possible to determine which type each of these two or more disjoint routes belongs to.

Furthermore, according to the second embodiment, since the bandwidth information is included in the summarized information, it is possible to determine whether redundant routes to an arbitrary destination are present and, if they are present, find a reservable maximum bandwidth.

Note that each component depicted in FIGS. 2 and 14 is functionally conceptual, and is not required to be physically configured as depicted.

That is, the specific form of distribution and unification of the components is not restricted to those depicted in the drawings. For example, the summarized-information generating unit 70/70A and the summarized-information reporting unit 80/80A may be unified. As such, all or part of the components can be configured by being functionally or physically distributed or unified by an arbitrary unit according to various loads and use states.

Furthermore, all or arbitrary part of the process function performed in each component can be achieved by a Central Processing Unit (CPU) and a program analyzed and executed on the CPU, or can be achieved as hardware with a wired logic.

The data relaying apparatus according to an embodiment reflects the determination result of the disjoint determining unit on the process of generating summarized information. For example, summarized information is generated only when redundant routes are present. Alternatively, identification information is made included in the summarized information for distinguishing between summarized information generated when redundant routes are present and summarized information generated when redundant routes are not present. Thus, it is possible to determine that all the routes obtained as a result of search by using the relevant summarized information are redundant.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus that retains topology information indicating how all nodes are coupled, in a predetermined target area within a network that is divided into a plurality of areas, the information processing apparatus comprising:
- a storage; and
- a processor configured
  - to determine, by referring to the storage having stored therein connected area information indicative of which area the node at a border with another area is coupled to, an ingress-node group of ingress nodes each serving as an entrance to the target area from an adjacent area and an egress-node group of egress nodes each serving as an exit from the target area to another adjacent area;
  - to determine, by referring to the topology information, whether two or more disjoint routes from one or more node of the ingress-node group to reach one or more node of the egress-node group are present;
  - only when it is determined that two or more disjoint routes are present, to abstract the ingress-node group into one node as an ingress abstract node, to abstract the egress-node group into one node as an egress abstract node, and to perform a process of generating summarized information indicating a route from the adjacent area through the target area to the other adjacent area as a link between the ingress abstract node and the egress abstract node; and
  - to report the summarized information to another area.

2. The information processing apparatus according to claim 1, wherein
the processor refers to a table that retains identification information of the areas and predetermined abstract node IDs in association with each other to determine an abstract node ID of the ingress abstract node based on identification information of the adjacent area, and an abstract node ID of the egress abstract node based on identification information of the other adjacent area, and then generates the summarized information based on the abstract node IDs.

3. The information processing apparatus according to claim 1, wherein
the processor generates the summarized information by using an abstract node ID of the ingress abstract node which is a combination of identification information of the target area and identification information of the adjacent area and an abstract node ID of the egress abstract node which is a combination of identification information of the other adjacent area and the identification information of the target area.

4. The information processing apparatus according to claim 1, wherein
the processor is further configured to receive from a node within the target area a connected-area reporting message including information indicative of which area the node is coupled to, and registers the information as the coupled area information in the storage.

5. The information processing apparatus according to claim 1, wherein
the processor is further configured to accept an input of the coupled area information for registration in the storage.

6. The information processing apparatus according to claim 1, wherein
the processor determines whether two or more disjoint routes from the virtual start-point node through any node of the ingress-node group and then any node of the egress-node group to reach the virtual end-point node not passing through a same node are present.

7. The information processing apparatus according to claim 1, wherein
the processor determines whether two or more disjoint routes from the virtual start-point node through any node of the ingress-node group and then any node of the egress-node group to reach the virtual end-point node not passing through a same link are present.

8. The information processing apparatus according to claim 1, wherein
the processor determines whether two or more node-disjoint routes from the virtual start-point node through any node of the ingress-node group and then any node of the egress-node group to reach the virtual end-point node not passing through a same node are present, or whether two or more link-disjoint routes from the start-point node to reach the end-point node not passing through a same link are present,
when it is determined that the node-disjoint routes are present, the processor generates the summarized information including information indicative of a bandwidth that can be reserved by the node-disjoint routes, information indicative of a bandwidth that can be reserved by the link-disjoint routes, and information indicative of a bandwidth that can be reserved by the simple route, and
when the link-disjoint routes are present, the processor generates the summarized information including information indicative of a bandwidth that can be reserved by the link-disjoint routes and information indicative of a bandwidth that can be reserved by the simple route.

9. The information processing apparatus according to claim 1, wherein
the processor determines whether two or more node-disjoint routes from the virtual start-point node through any node of the ingress-node group and then any node of the egress-node group to reach the virtual end-point node not passing through a same node are present, or whether two or more link-disjoint routes from the start-point node to reach the end-point node not passing through a same link are present,
when it is determined that the node-disjoint routes are present, the processor generates the summarized information including information indicative of a maximum bandwidth that can be reserved by the node-disjoint routes, the summarized information including information indicative of a maximum bandwidth that can be reserved by the link-disjoint routes, and the summarized information including information indicative of a maximum bandwidth that can be reserved by the simple route, and
when the link-disjoint routes are present, the processor generates the summarized information including information indicative of a maximum bandwidth that can be reserved by the link-disjoint routes and the summarized information including information indicative of a maximum bandwidth that can be reserved by the simple route.

10. The information processing apparatus according to claim 1, wherein
the processor is further configured to serve as one of nodes in the target area and broadcasts in the target area a connected-area reporting message including information indicative of which area the information processing apparatus is coupled to.

11. The information processing apparatus according to claim 10, wherein
the processor is further configured to refer to the connected-area reporting message received from outside and, based on the information included in the connected-area reporting message, to control whether the processor generates the summarized information.

12. An information processing apparatus that retains topology information indicating how all nodes are coupled to configure a network, in a predetermined target area within a network that is divided into a plurality of areas, the information processing apparatus comprising:
- a storage; and
- a processor configured
  - to determine, by referring to the storage having stored therein connected area information indicative of which area the node at a border with another area is coupled to, an ingress-node group of ingress nodes each serving as an entrance to the target area from an adjacent area and an egress-node group of egress nodes each serving as an exit from the target area to another adjacent area;
  - to determine, by referring to the topology information, whether two or more node-disjoint routes from the virtual start-point node through any node of the ingress-node group and then any node of the egress-node group to reach the virtual end-point node not passing through a same node are present, whether two or more link-disjoint routes from the start-point node to reach the end-point node not passing through a same link are present, or whether a simple route from the start-point node to the end-point node is present;
  - only when it is determined that two or more node-disjoint routes are present, two or more link-disjoint routes are present, or the simple route is present, to abstract the ingress-node group into one node as an ingress abstract node, to abstract the egress-node group into one node as an egress abstract node, and to perform a process of generating summarized information indicating a route from the adjacent area through the target area to the other adjacent area as a link between the ingress abstract node and the egress abstract node; and
  - to report the summarized information to another area.

13. The information processing apparatus according to claim 12, wherein
the processor refers to a table that retains identification information of the areas and predetermined abstract node IDs in association with each other to determine an abstract node ID of the ingress abstract node based on identification information of the adjacent area, and an abstract node ID of the egress abstract node based on identification information of the other adjacent area, and then generates the summarized information based on the abstract node IDs.

14. The information processing apparatus according to claim 12, wherein
the processor generates the summarized information by using an abstract node ID of the ingress abstract node which is a combination of identification information of the target area and identification information of the adjacent area and an abstract node ID of the egress abstract node which is a combination of identification information of the other adjacent area and the identification information of the target area.

15. The information processing apparatus according to claim 12, wherein
the processor is further configured to receive from a node within the target area a connected-area reporting message including information indicative of which area the node is coupled to, and registers the information as the coupled area information in the storage.

16. The information processing apparatus according to claim 12, wherein
the processor is further configured to accept an input of the coupled area information for registration in the storage.

17. The information processing apparatus according to claim 12, wherein
when it is determined that the node-disjoint routes are present, the processor generates the summarized information including information indicative of a bandwidth that can be reserved by the node-disjoint routes, information indicative of a bandwidth that can be reserved by the link-disjoint routes, and information indicative of a bandwidth that can be reserved by the simple route,
when the link-disjoint routes are present, the processor generates the summarized information including information indicative of a bandwidth that can be reserved by the link-disjoint routes and information indicative of a bandwidth that can be reserved by the simple route, and
when the simple route is present, the processor generates the summarized information including information indicative of a bandwidth that can be reserved by the simple route.

18. The information processing apparatus according to claim 12, wherein
when it is determined that the node-disjoint routes are present, the processor generates the summarized information including information indicative of a maximum bandwidth that can be reserved by the node-disjoint routes, the summarized information including information indicative of a maximum bandwidth that can be reserved by the link-disjoint routes, and the summarized information including information indicative of a maximum bandwidth that can be reserved by the simple route,
when the link-disjoint routes are present, the processor generates the summarized information including information indicative of a maximum bandwidth that can be reserved by the link-disjoint routes and the summarized information including information indicative of a maximum bandwidth that can be reserved by the simple route, and
when the simple route is present, the processor generates the summarized information including information indicative of a maximum bandwidth that can be reserved by the simple route.

19. The information processing apparatus according to claim 12, wherein
the processor is further configured to serve as one of nodes in the target area and broadcasts in the target area a connected-area reporting message including information indicative of which area the information processing apparatus is coupled to.

20. The information processing apparatus according to claim 19, wherein
the processor is further configured to refer to the connected-area reporting message received from outside and, based on the information included in the connected-area reporting message, to control whether the summarized-information generating unit generates the summarized information.

21. A method for summarizing a target area within a network that is divided into a plurality of areas, the method comprising:
firstly determining, by referring to a storage having stored therein connected area information indicative of which area a node at a border with another area is coupled to, an ingress-node group of ingress nodes each serving as an entrance to the target area from an adjacent area, and an egress-node group of egress nodes each serving as an exit from the target area to another adjacent area;

secondly determining, by referring to topology information of the target area, whether two or more disjoint routes from one or more node of the ingress-node group to reach one or more node of the egress-node group are present;

abstracting, only when it is determined at the secondly determining that two or more disjoint routes are present, the ingress-node group into one node as an ingress abstract node;

abstracting, only when it is determined at the secondly determining that two or more disjoint routes are present, the egress-node group into one node as an egress abstract node;

performing, only when it is determined at the secondly determining that two or more disjoint routes are present, a process of generating summarized information indicating a route from the adjacent area through the target area to the other adjacent area as a link between the ingress abstract node and the egress abstract node; and reporting the summarized information generated in the performing to another area.

22. A non-transitory computer readable medium including programmed instructions for summarizing a target area within a network that is divided into a plurality of areas, wherein the instructions, when executed by a computer, causes the computer to perform:

firstly determining, by referring to a storage having stored therein connected area information indicative of which area a node at a border with another area is coupled to, an ingress-node group of ingress nodes each serving as an entrance to the target area from an adjacent area, and an egress-node group of egress nodes each serving as an exit from the target area to another adjacent area;

secondly determining, by referring to topology information of the target area, whether two or more disjoint routes from one or more node of the ingress-node group to reach one or more node of the egress-node group are present;

abstracting, only when it is determined at the secondly determining that two or more disjoint routes are present, the ingress-node group into one node as an ingress abstract node;

abstracting, only when it is determined at the secondly determining that two or more disjoint routes are present, the egress-node group into one node as an egress abstract node;

performing, only when it is determined at the secondly determining that two or more disjoint routes are present, a process of generating summarized information indicating a route from the adjacent area through the target area to the other adjacent area as a link between the ingress abstract node and the egress abstract node; and reporting the summarized information generated in the performing to another area.

* * * * *